US012782647B2

(12) United States Patent
McKerlie et al.

(10) Patent No.: US 12,782,647 B2
(45) Date of Patent: Nov. 3, 2026

(54) ULTRA LOW PROFILE OPTICAL FIBER DUPLEX ADAPTOR FOR MODULES AND CIRCUIT PACKS

(71) Applicant: Ciena Corporation, Hanover, MD (US)

(72) Inventors: Maxwell Thomas McKerlie, Richmond (CA); Victor Aldea, Ottawa (CA); Trevor Meunier, Kemptville (CA)

(73) Assignee: Ciena Corporation, Fulton, MD (US)

( * ) Notice: Subject to any disclaimer, the term of this patent is extended or adjusted under 35 U.S.C. 154(b) by 417 days.

(21) Appl. No.: 18/369,961

(22) Filed: Sep. 19, 2023

(65) Prior Publication Data

US 2025/0093591 A1 Mar. 20, 2025

(51) Int. Cl.
*G02B 6/00* (2006.01)
*G02B 6/38* (2006.01)

(52) U.S. Cl.
CPC ......... *G02B 6/3897* (2013.01); *G02B 6/3825* (2013.01); *G02B 6/3893* (2013.01)

(58) Field of Classification Search
CPC ................ G02B 6/3897; G02B 6/3825; G02B 6/3893; G02B 6/00
See application file for complete search history.

(56) References Cited

U.S. PATENT DOCUMENTS

| | | | | |
|---|---|---|---|---|
| 6,612,750 B1 * | 9/2003 | Bull | G02B 6/3825 | 385/83 |
| 7,572,065 B2 * | 8/2009 | Lu | G02B 6/3816 | 385/86 |
| 8,213,761 B2 * | 7/2012 | Gronvall | G02B 6/44515 | 385/139 |
| 9,261,654 B2 * | 2/2016 | Murphy | G02B 6/3897 | |
| 10,488,604 B2 * | 11/2019 | Leigh | G02B 6/3879 | |

* cited by examiner

*Primary Examiner* — Jennifer Doan
(74) *Attorney, Agent, or Firm* — Clements Bernard Walker; Christopher L. Bernard

(57) ABSTRACT

An optical fiber adaptor assembly including: an adaptor body having an internal side and an external side, where the internal side receives and retains an optical fiber ferrule assembly and the external side is adapted to receive and retain an optical fiber connector assembly, and where the adaptor body is adapted to be disposed through and retained in a cut-out defined by a panel of a module or circuit pack. The internal side of the adaptor body includes an adaptor shoulder that is adapted to be disposed adjacent to an internal side of the panel when the adaptor body is disposed through and retained in the cut-out. The internal side of the adaptor body further includes a ferrule retention clip that is adapted to be coupled to the adaptor shoulder and prevent the ferrule assembly from backing out of a ferrule port defined by the internal side of the adaptor body.

17 Claims, 10 Drawing Sheets

ULTRA LOW PROFILE OPTICAL FIBER DUPLEX ADAPTOR FOR MODULES AND CIRCUIT PACKS

TECHNICAL FIELD

The present disclosure relates generally to the telecommunications and networking fields. More particularly, the present disclosure relates to an ultra low profile optical fiber duplex adaptor for modules and circuit packs.

BACKGROUND

Lucent connector (LC) and like adaptors are commonly used on telecommunications and networking products to retain and interface LCs and the like internal and external to the products, which may be modules and circuit packs, for example. Until recently, the density of these modules and circuit packs was such that these conventional LC adaptors could be used without any issues from size and form factor perspectives. There has generally been a preference to use fiber optic cables that are terminated with LC connectors or the like for added robustness during the assembly of the telecommunications and networking products. More recently, the density of modules and circuit packs has introduced more stringent size and form factor constraints, especially internal to the modules and circuit packs. Some smaller versions of conventional LC adaptors are available, although tend to be made of plastic, thereby not providing electromagnetic interference (EMI) shielding. Both larger and smaller versions of conventional LC adaptors occupy physical volume within a module or circuit pack that could be used for other mechanical or optical components.

The present background is provided as illustrative environmental context only and should not be construed to be limiting in any manner. It will be readily apparent to those of ordinary skill in the art that the principles and concepts of the present disclosure may be implemented in other environmental contexts equally.

BRIEF SUMMARY

The present disclosure provides an LC or like adaptor that utilizes an adaptor body that protrudes much less behind the faceplate panel of the associated module or circuit pack, i.e. the distance between the adaptor body flange surface and where the optical fiber exits the adaptor body is much shorter behind the faceplate panel. With this design, the internal optical fibers do not require an LC or the like, thereby taking up 90% less space than a typical fully-mated LC or like adaptor configuration when considering the space behind the faceplate panel of the module or circuit pack. This space savings allows the number of features supported for a given product to be increased due to increased placement room for optical components and improves cooling efficiency due to the increased physical space for thermo-mechanical components, such as heatsinks. The ease of use and simplicity of the design increases through-put and yield of product, as well as reduces rework time if required. A duplex adaptor is illustrated and described, configured to receive external transmit and receive LC adaptors and internal transmit and receive optical fibers, however, fewer or more external LC adaptors and internal optical fibers may be received equally. Further, metallic components may be used to provide EMI shielding.

In one embodiment, the present disclosure provides an optical fiber adaptor assembly including: an adaptor body having an internal side and an external side, where the internal side is adapted to receive and retain an optical fiber ferrule assembly and the external side is adapted to receive and retain an optical fiber connector assembly, and where the adaptor body is adapted to be disposed through and retained in a cut-out defined by a panel of a module or circuit pack. The internal side of the adaptor body defines a ferrule port adapted to receive the optical fiber ferrule assembly. The internal side of the adaptor body includes a ferrule gasket adapted to be disposed between a ferrule shoulder of the optical fiber ferrule assembly and the internal side of the adaptor body when the optical fiber ferrule assembly is received within the ferrule port defined by the internal side of the adaptor body. The internal side of the adaptor body includes an adaptor shoulder that is adapted to be disposed adjacent to an internal side of the panel when the adaptor body is disposed through and retained in the cut-out defined by the panel. The internal side of the adaptor body further includes a ferrule retention clip that is adapted to be coupled to the adaptor shoulder and prevent the optical fiber ferrule assembly from backing out of the ferrule port defined by the internal side of the adaptor body. The ferrule retention clip includes arm structures that are adapted to be disposed within slot structures of the adaptor shoulder. The internal side of the adaptor body includes further includes a panel gasket disposed between the adaptor shoulder and the internal side of the panel when the adaptor shoulder is disposed adjacent to the internal side of the panel when the adaptor body is disposed through and retained in the cut-out defined by the panel. The external side of the adaptor body defines a connector port adapted to receive the optical fiber connector assembly. The optical fiber adaptor assembly further includes a panel retention clip coupled to the adaptor by and adapted to secure the adaptor body to the panel when the adaptor body is disposed through and retained in the cut-out defined by the panel. Optionally, the optical fiber adaptor assembly is a duplex optical fiber adaptor assembly, the internal side is adapted to receive and retain a pair of optical fiber ferrule assemblies, and the external side is adapted to receive and retain a pair of optical fiber connector assemblies.

In another embodiment, the present disclosure provides a module or circuit pack including: a panel having an internal side and an external side and defining a cut-out; and an optical fiber adaptor assembly including an adaptor body having an internal side and an external side, where the internal side receives and retains an optical fiber ferrule assembly and the external side is adapted to receive and retain an optical fiber connector assembly, and where the adaptor body is disposed through and retained in the cut-out defined by the panel. Optionally, the optical fiber adaptor assembly is a duplex optical fiber adaptor assembly, the internal side receives and retains a pair of optical fiber ferrule assemblies, and the external side is adapted to receive and retain a pair of optical fiber connector assemblies.

In a further embodiment, the present disclosure provides an optical fiber adaptor method including: providing an optical fiber adaptor assembly including an adaptor body having an internal side and an external side, where the internal side is adapted to receive and retain an optical fiber ferrule assembly and the external side is adapted to receive and retain an optical fiber connector assembly; coupling the optical fiber ferrule assembly to the internal side of the adaptor body; and disposing the adaptor body through a cut-out defined by a panel of a module or circuit pack and securing the adaptor body to the panel. The internal side of the adaptor body defines a ferrule port adapted to receive the optical fiber ferrule assembly. The optical fiber adaptor method further includes disposing a ferrule gasket between a ferrule shoulder of the optical fiber ferrule assembly and the internal side of the adaptor body when the optical fiber ferrule assembly is received within the ferrule port defined by the internal side of the adaptor body. The internal side of the adaptor body includes an adaptor shoulder that is adapted to be disposed adjacent to an internal side of the panel when the adaptor body is disposed through the cut-out defined by the panel and secured to the panel. The internal side of the adaptor body further includes a ferrule retention clip that is adapted to be coupled to the adaptor shoulder and prevent the optical fiber ferrule assembly from backing out of the ferrule port defined by the internal side of the adaptor body. The optical fiber adaptor method further includes disposing a panel gasket between the adaptor shoulder and the internal side of the panel when the adaptor shoulder is disposed adjacent to the internal side of the panel when the adaptor body is disposed through the cut-out defined by the panel and secured to the panel. The optical fiber adaptor assembly further includes a panel retention clip coupled to the adaptor body and adapted to secure the adaptor body to the panel when the adaptor body is disposed through the cut-out defined by the panel. Optionally, the optical fiber adaptor assembly is a duplex optical fiber adaptor assembly, the internal side is adapted to receive and retain a pair of optical fiber ferrule assemblies, and the external side is adapted to receive and retain a pair of optical fiber connector assemblies, the method including coupling the pair of optical fiber ferrule assemblies to the internal side of the adaptor body.

It will be readily apparent to those of ordinary skill in the art that aspects and features of each of the described embodiments may be incorporated, omitted, and/or combined as desired in a given application, without limitation.

BRIEF DESCRIPTION OF THE DRAWINGS

The present disclosure is illustrated and described with reference to the various drawings, in which like reference numbers are used to denote like assembly components/method steps, as appropriate, and in which.

It will be readily apparent to those of ordinary skill in the art that aspects and features of each of the illustrated embodiments may be incorporated, omitted, and/or combined as desired in a given application, without limitation.

DETAILED DESCRIPTION

Again, the present disclosure provides an LC or like adaptor that utilizes an adaptor body that protrudes much less behind the faceplate panel of the associated module or circuit pack, i.e. the distance between the adaptor body flange surface and where the optical fiber exits the adaptor body is much shorter behind the faceplate panel. With this design, the internal optical fibers do not require an LC or the like, thereby taking up 90% less space than a typical fully-mated LC or like adaptor configuration when considering the space behind the faceplate panel of the module or circuit pack. This space savings allows the number of features supported for a given product to be increased due to increased placement room for optical components and improves cooling efficiency due to the increased physical space for thermo-mechanical components, such as heatsinks. The ease of use and simplicity of the design increases through-put and yield of product, as well as reduces rework time if required. A duplex adaptor is illustrated and described, configured to receive external transmit and receive LC adaptors and internal transmit and receive optical fibers, however, fewer or more external LC adaptors and internal optical fibers may be received equally. Further, metallic components may be used to provide EMI shielding.

The adaptor of the present disclosure is a device or assembly designed to couple fiber optic connections through a panel of a module or circuit pack, while minimizing intrusion into the available space behind the panel. Such duplex adaptors, or couplers, typically connect two LC or like connector pairs in one module or circuit pack. The adaptor includes a split sleeve used to align the ferrules of each connector to transmit an optical signal from one connector to another. The adaptor has features to align and hold the connector body, as well as engage with the latch on the connector to retain it. The adaptor typically has a flanged body to act as a stop when the adaptor is inserted into a panel cut-out. Retention clips, either as a separate part or integrated into the adapter body, are used to secure the adapter to the panel once fully inserted into the cut-out.

The adaptor design removes the internal-side connector ports and allows for optical fibers terminated with ferrule assemblies plugged directly into the adaptor. The split sleeve that is typically contained within the adaptor body is instead assembled with the ferrule of each internal optical fiber, simplifying the construction of the adaptor body.

Figure 1:
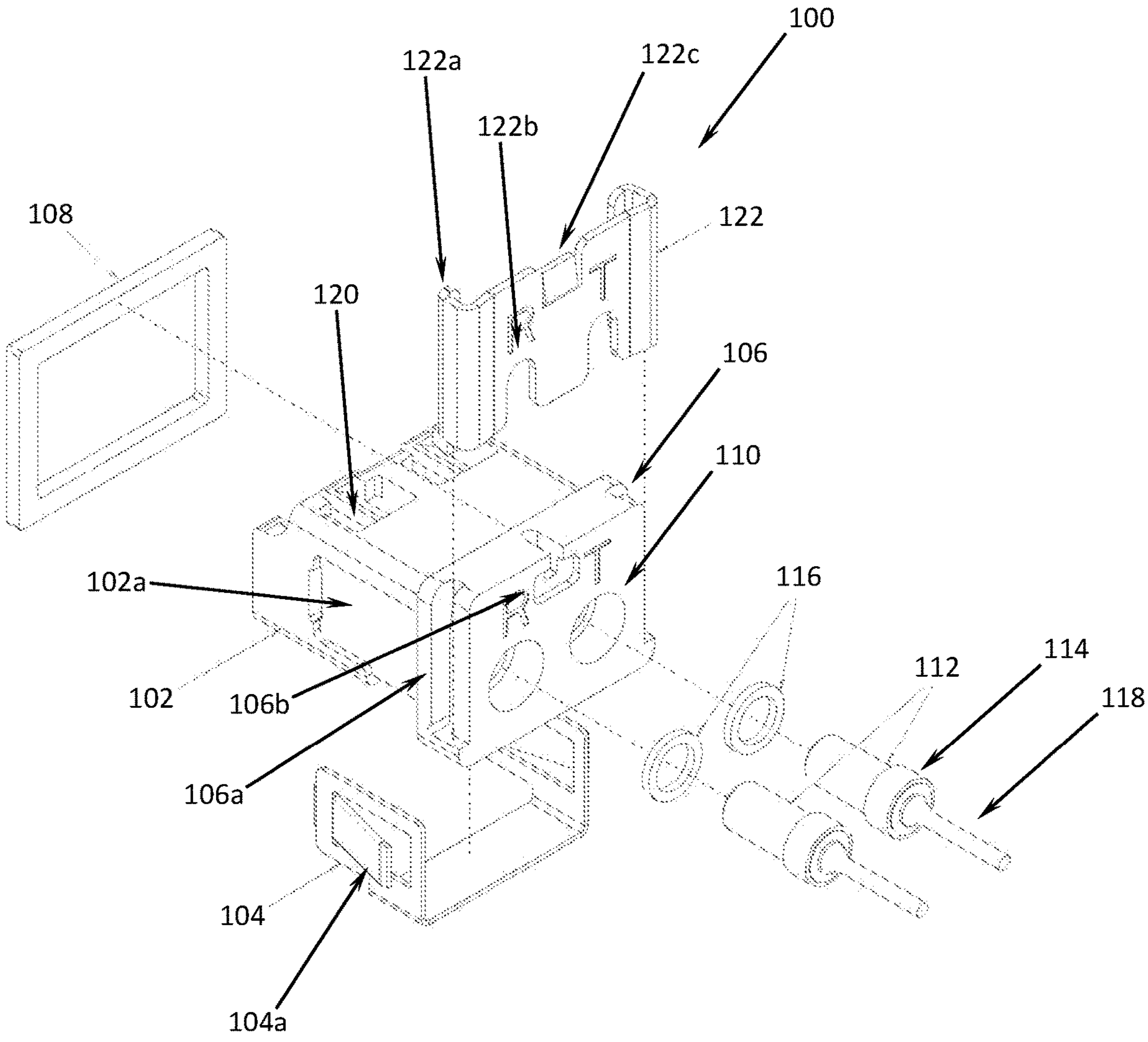
FIG. 1 illustrates an exploded perspective view of one embodiment of the optical fiber adaptor assembly of the present disclosure.

Referring now to FIG. 1, the adaptor 100 includes an adaptor body 102 that is a prismatic structure having a rectangular, square, or other suitable shape that is adapted to be received with a cut-out of a panel, such as a faceplate panel, of a module, circuit pack, or the like. The adaptor body 102 is secured to the panel via a panel retention clip 104 disposed around and/or coupled to the adaptor body 102. In this embodiment, the adaptor body 102 is disposed through the cut-out in an internal-to-external direction and an adaptor shoulder 106 of the adaptor body 102 is adapted to compress a panel gasket 108 that is disposed about the adaptor body 102 against the internal side of the panel, thereby providing sealing engagement of the adaptor body 102 to the panel via the panel retention clip 104.

The internal side of the adaptor body 102 includes ferrule ports 110 for receiving corresponding ferrule assemblies 112 within the module or circuit pack. Each of these ferrule assemblies 112 include a ferrule shoulder 114 that limits penetration of the ferrule assembly 112 into the adaptor body 102 and compresses a corresponding ferrule gasket 116 against the adaptor body 102, again providing a degree of sealing engagement. As illustrated for this duplex adaptor 100, internal transmit and receive ferrule ports 110 are provided to receive transmit and receive ferrule assemblies 112 and the corresponding optical fibers 118.

The external side of the adaptor body 102 includes connector ports 120 for receiving corresponding connectors within the module or circuit pack in a conventional manner. As illustrated for this duplex adaptor 100, external transmit and receive connector ports 120 are provided to receive transmit and receive connectors and the corresponding optical fibers. The connector ports 120 may be, for example, TIA-FOCIS-10B-compliant duplex LC receptacle ports or the like that are accessible from the external side of the panel due to the protrusion of the adaptor body 102 through and from the external side of the panel.

The ferrule assemblies 112 disposed in and aligned by the ferrule ports 110 on the internal side of the adaptor body 102 are secured to the adaptor body 102 using a ferrule retention clip 122 that, in this embodiment, includes arm structures **122*a* that are configured to be slid vertically downwards in slot structures 106*a* of the adaptor shoulder 106 of the adaptor body 102. When installed, this ferrule retention clip 122 contacts the ferrule shoulders 114 of the ferrule assemblies 112 at the internal-side end of the adaptor body 102 and prevents the ferrule assemblies 112 from backing out of the adaptor body 102 unless the ferrule retention clip 122 is removed. The ferrule retention clip 122 includes vertical slots 122*b* corresponding to the ferrule assemblies 112 that allow the ferrule assemblies 112 to pass through the ferrule retention clip 122 when retained. It will be readily apparent to those of ordinary skill in the art that other ferrule retention mechanisms may alternatively be used to secure the ferrule assemblies 112 within the adaptor body 102. As illustrated, the ferrule retention clip 122 may include a clip arm 122*c* that is adapted to engage a corresponding clip recess 106*b* of the adaptor shoulder 106 when the ferrule retention clip 122 is in place, thereby securing the ferrule retention clip 122 to the adaptor body 102 and locking the ferrule assemblies 112** in place, unless released.

In this embodiment, the panel retention clip 104 is adapted to nest within a clip recess **102*a* formed around some or all sides of the adaptor body 102, thereby allowing the panel retention clip 104 to sit flush with the surface(s) of the adaptor body 102. A pair of opposed spring arms, tabs, or the like 104*a* are provided on the panel retention clip 104 and designed to deflect as the adaptor body 102 is inserted through the panel and expand when the adaptor shoulder 106 of the adaptor body 102 is seated against the panel gasket 108 and the internal side of the panel, thereby securing the adaptor body 102 to the panel. Inwards squeezing of the opposed spring arms, tabs, or the like 104*a* serves to release the adaptor body 102** for removal from the panel.

Figure 2:
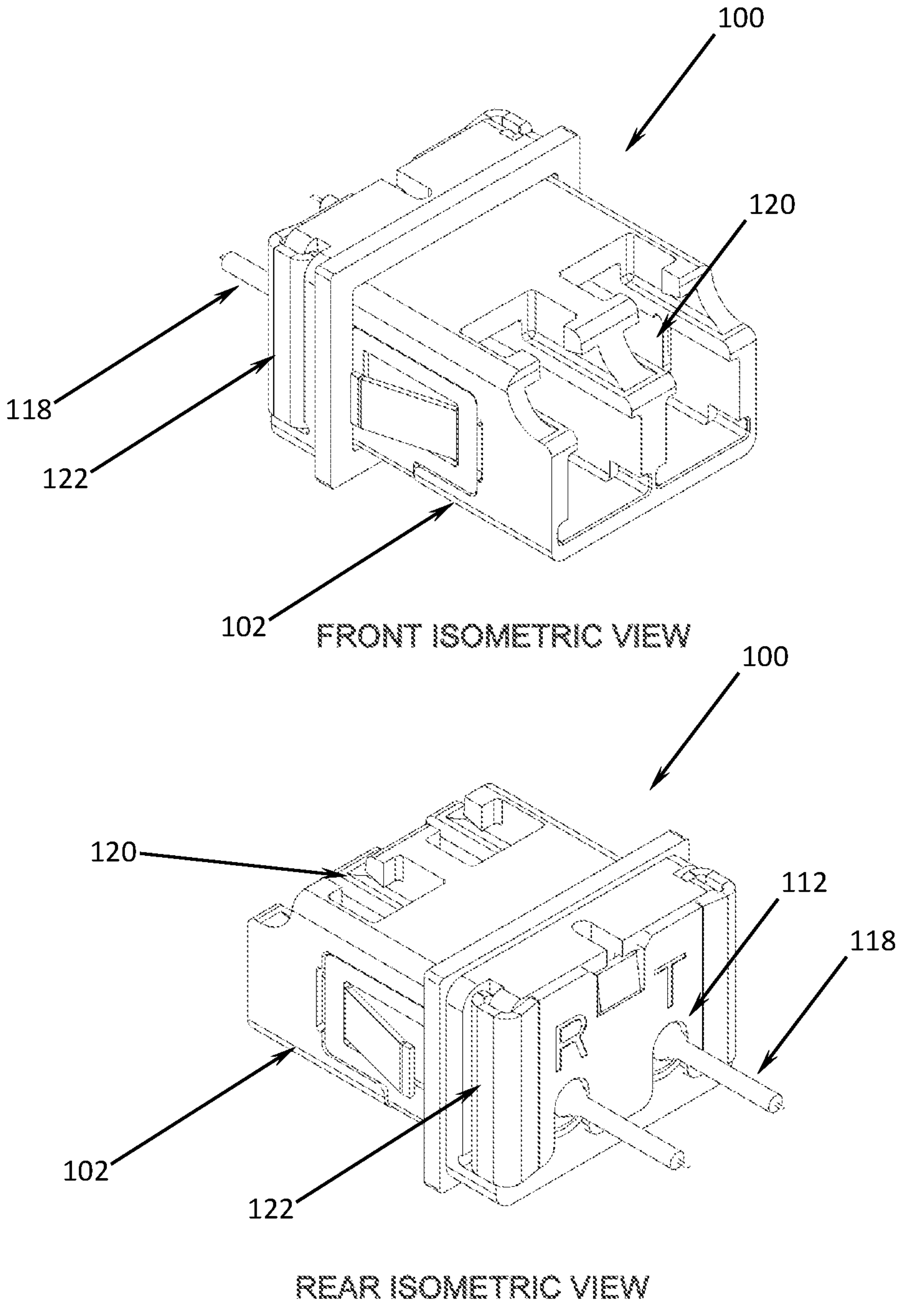
FIG. 2 illustrates front and rear perspective views of one embodiment of the optical fiber adaptor assembly of the present disclosure.

FIG. 2 shows front (external) and rear (internal) perspective views of the duplex adaptor assembly 100, with transmit and receive ferrule assemblies 112 and optical fibers 118 secured to the internal side of the adaptor body 102 by the inserted ferrule retention clip 122. No connectors are coupled to the connector ports 120 of the external side of the adaptor body 102 and the panel is omitted, for the sake of clarity.

Figure 3:
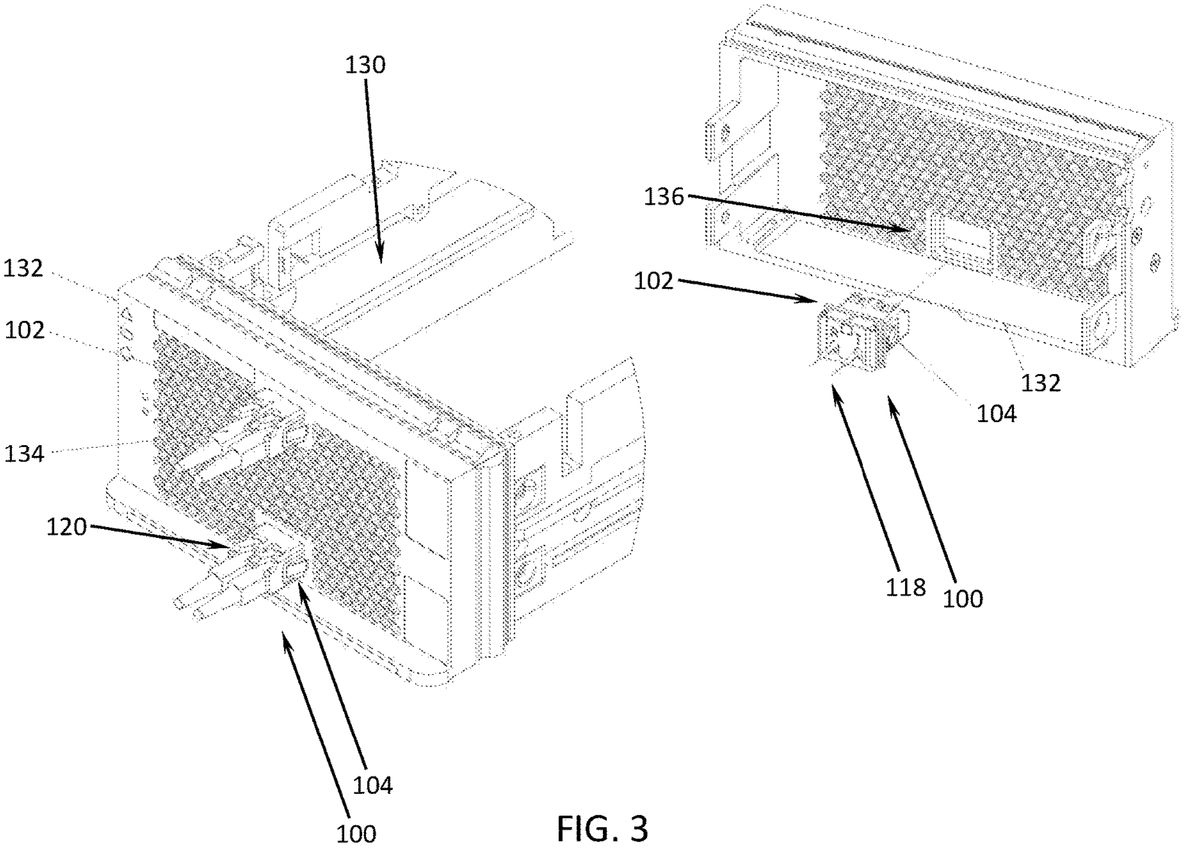
FIG. 3 illustrates external and internal perspective views of one embodiment of the optical fiber adaptor assembly of the present disclosure installed in the faceplate panel of a module or circuit pack.

FIG. 3 shows external and internal perspective views of duplex adaptor assemblies 100 installed in the faceplate panel 132 of a module or circuit pack 130. In the external view, a pair of connectors 134 can be seen coupled to the connector ports 120 of the adaptor body 102 external to the module or circuit pack 130. In the internal view, transmit and receive optical fibers 118 are installed in the adaptor body 102, which can be seen being inserted into and partially through a cut-out 136 of the faceplate panel 132. It should be noted that the optical fibers 118 may be installed in the adaptor body 102 before the adaptor body 102 is inserted into and partially through the cut-out 136 of the faceplate panel 132, while the connectors 134 are typically coupled to the connector ports 120 of the adaptor body 102 after the adaptor body is inserted into and partially through the cut-out 136 of the faceplate panel 132 and secured to the faceplate panel 132 via actuation of the panel retention clip 104.

Figure 4:
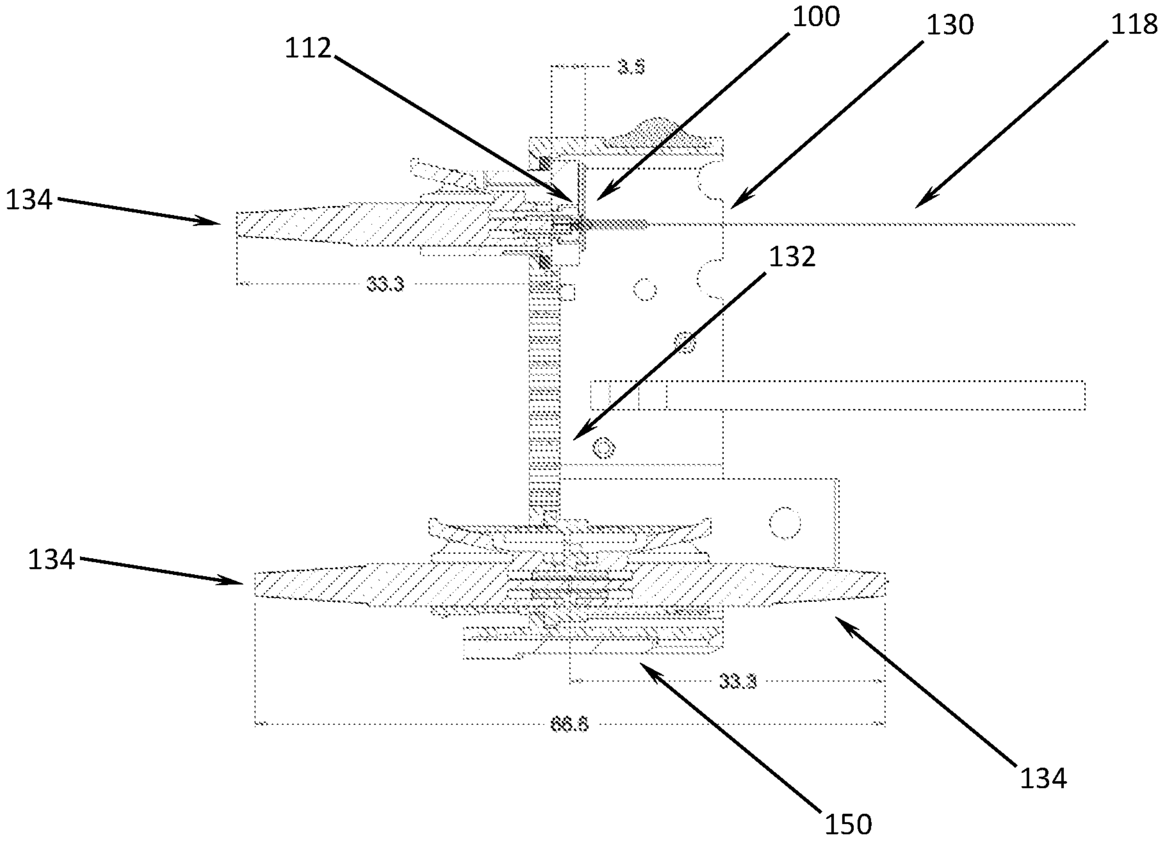
FIG. 4 illustrates a cross-sectional view of one embodiment of the optical fiber adaptor assembly of the present disclosure installed in the faceplate panel of a module or circuit pack versus a conventional LC adaptor installed in the faceplate panel of the module or circuit pack, highlighting the reduced depth and internal space savings of the optical fiber adaptor assembly of the present disclosure.

FIG. 4 shows a cross-sectional view of the adaptor assembly 100 installed in the faceplate panel 132 of a module or circuit pack 130 versus a conventional LC adaptor 150 installed in the faceplate panel 132 of the module or circuit pack 130, highlighting the reduced depth and internal space savings of the adaptor assembly 100. The adaptor assembly 100 couples a connector 134 external to the module or circuit pack 130 to a ferrule assembly 112 and optical fiber 118 internal to the module or circuit pack 130, while the LC adaptor 150 couples a connector 134 external to the module or circuit pack 130 to another connector 134 internal to the module or circuit pack 130. The absence of this additional connector 134 internal to the module or circuit pack 130 provides the internal space savings of the adaptor assembly 100 over the LC adaptor 150.

Figure 5:
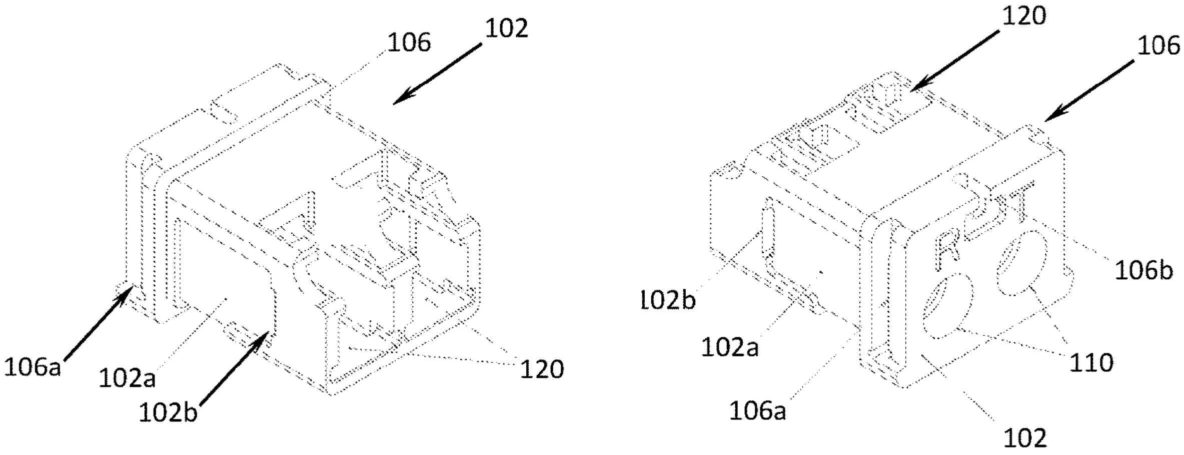
FIG. 5 illustrates front and rear perspective views of one embodiment of the adaptor body of the optical fiber adaptor assembly of the present disclosure.

FIG. 5 shows front and rear perspective views of the adaptor body 102. The internal side of the adaptor body 102 includes the ferrule ports 110. As illustrated for this duplex adaptor body 102, internal transmit and receive ferrule ports 110 are provided to receive transmit and receive ferrule assemblies 112 and the corresponding optical fibers 118. The external side of the adaptor body 102 includes the connector ports 120. As illustrated for this duplex adaptor body 102, external transmit and receive connector ports 120 are provided to receive transmit and receive connectors 134 and the corresponding optical fibers.

The ferrule assemblies 112 disposed in and aligned by the ferrule ports 110 on the internal side of the adaptor body 102 are secured to the adaptor body 102 using the ferrule retention clip 122 that, in this embodiment, includes arm structures **122*a* that are configured to be slid vertically downwards in the slot structures 106*a* of the adaptor shoulder 106 of the adaptor body 102. As illustrated, the ferrule retention clip 122 may include the clip arm 122*c* that is adapted to engage the corresponding clip recess 106*b* of the adaptor shoulder 106 when the ferrule retention clip 122 is in place, thereby securing the ferrule retention clip 122 to the adaptor body 102 and locking the ferrule assemblies 112** in place, unless released.

In this embodiment, the panel retention clip 104 is adapted to nest within the clip recess 102*a* formed around some or all sides of the adaptor body 102, thereby allowing the panel retention clip 104 to sit flush with the surface(s) of the adaptor body 102. The clip recess 102*a* includes a pair of clip recess cut-outs 102*b* at side-external edges thereof that are adapted to align and mate with corresponding alignment tabs of the panel retention clip 104 when the panel retention clip 104 is in place within the clip recess 102*a*. In this embodiment, the clip recess 102*a* is a contiguous recess disposed about the side and bottom surfaces of the adaptor body 102.

Figure 6:
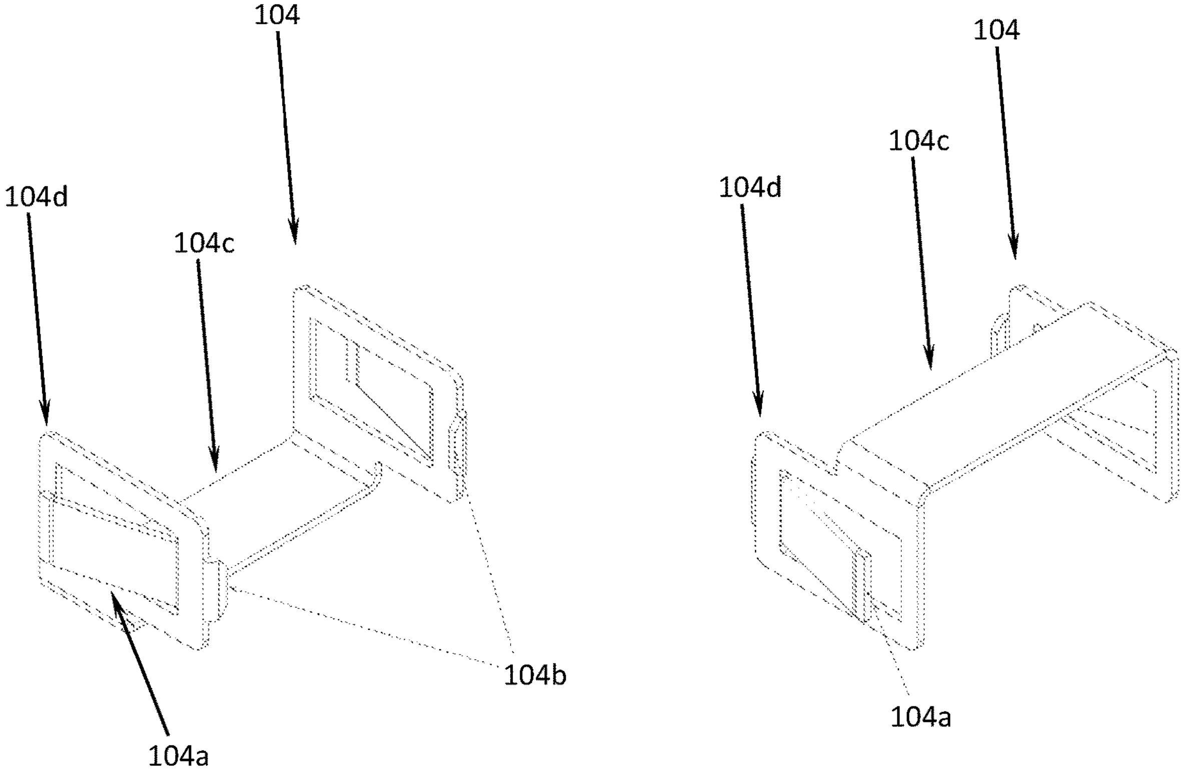
FIG. 6 illustrates front and rear perspective views of one embodiment of the faceplate (or other) panel retention clip of the optical fiber adaptor assembly of the present disclosure.

FIG. 6 shows front and rear perspective views of the faceplate (or other) panel retention clip 104 of the adaptor assembly 100. The panel retention clip 104 is a bent sheet metal or molded plastic part with the pair of opposed spring arms, tabs, or the like 104*a* that are designed to deflect as the adaptor body 102 is inserted through the panel 132 and expand when the adaptor shoulder 106 of the adaptor body 102 is seated against the panel gasket 108 and the internal side of the panel 132, thereby securing the adaptor body 102 to the panel. Inwards squeezing of the opposed spring arms, tabs, or the like 104*a* serves to release the adaptor body 102 for removal from the panel 132. The panel retention clip 104 also includes the alignment tabs 104*b* that are adapted to engage the clip recess cut-outs 102*b* at side-external edges of the clip recess 102*a*, thereby aligning the panel retention clip 104 with and securing the panel retention clip 104 to the adaptor body 102. In this embodiment, the panel retention clip 104 is a U-shaped structure having a bottom member 104*c* and side members 104*d* each including one of the spring arms, tabs, or the like 104*a* and alignment tabs 104*b*.

Figure 7:
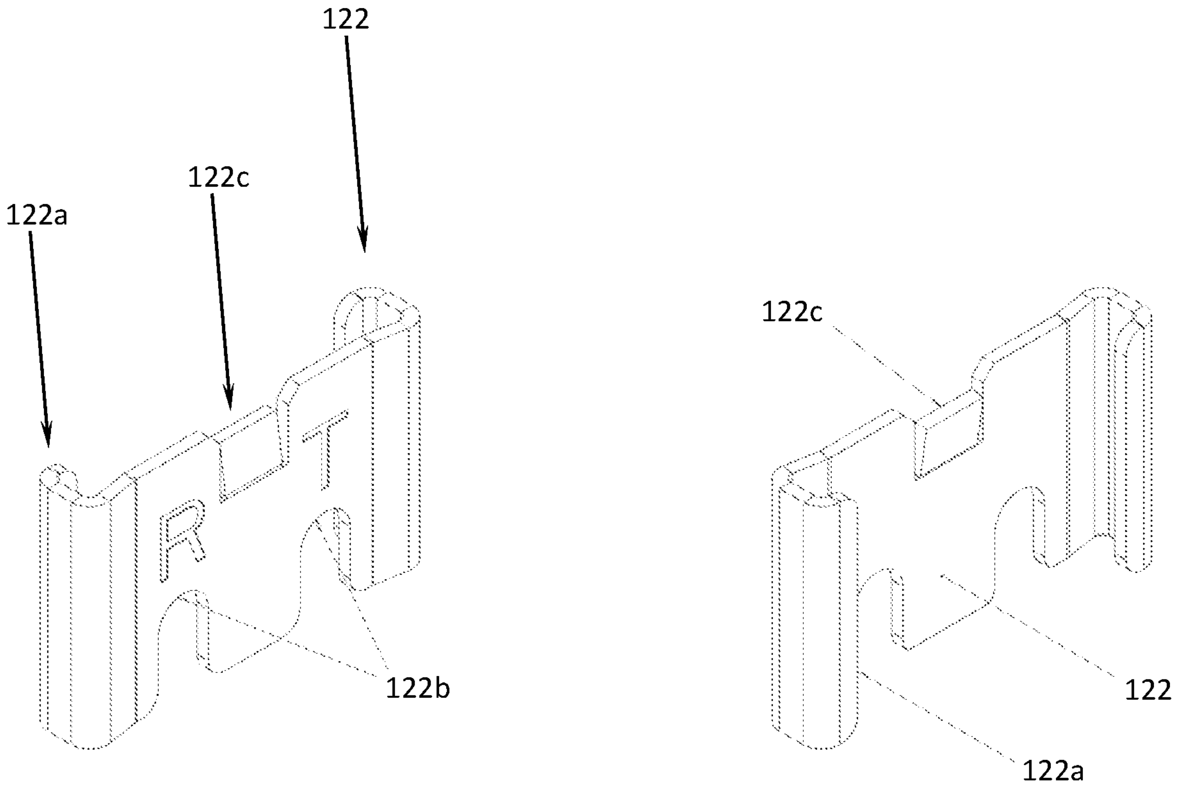
FIG. 7 illustrates rear and front perspective views of one embodiment of the optical fiber ferrule retention clip of the optical fiber adaptor assembly of the present disclosure.

FIG. 7 shows rear and front perspective views of the ferrule retention clip 122 of the adaptor assembly 100. The ferrule retention clip 122 is a bent sheet metal or molded plastic part with the arm structures 122*a* (which could be hooks or tabs) that are configured to be slid vertically downwards in the slot structures 106*a* of the adaptor shoulder 106 of the adaptor body 102 and the vertical slots 122*b* corresponding to the ferrule assemblies 112 that allow the ferrule assemblies 112 to pass through the ferrule retention clip 122 when retained. The ferrule retention clip 122 also includes the clip arm 122*c* that is adapted to engage the corresponding clip recess 106*b* of the adaptor shoulder 106 when the ferrule retention clip 122 is in place, thereby securing the ferrule retention clip 122 to the adaptor body 102 and locking the ferrule assemblies 112 in place, unless released.

Figure 8:
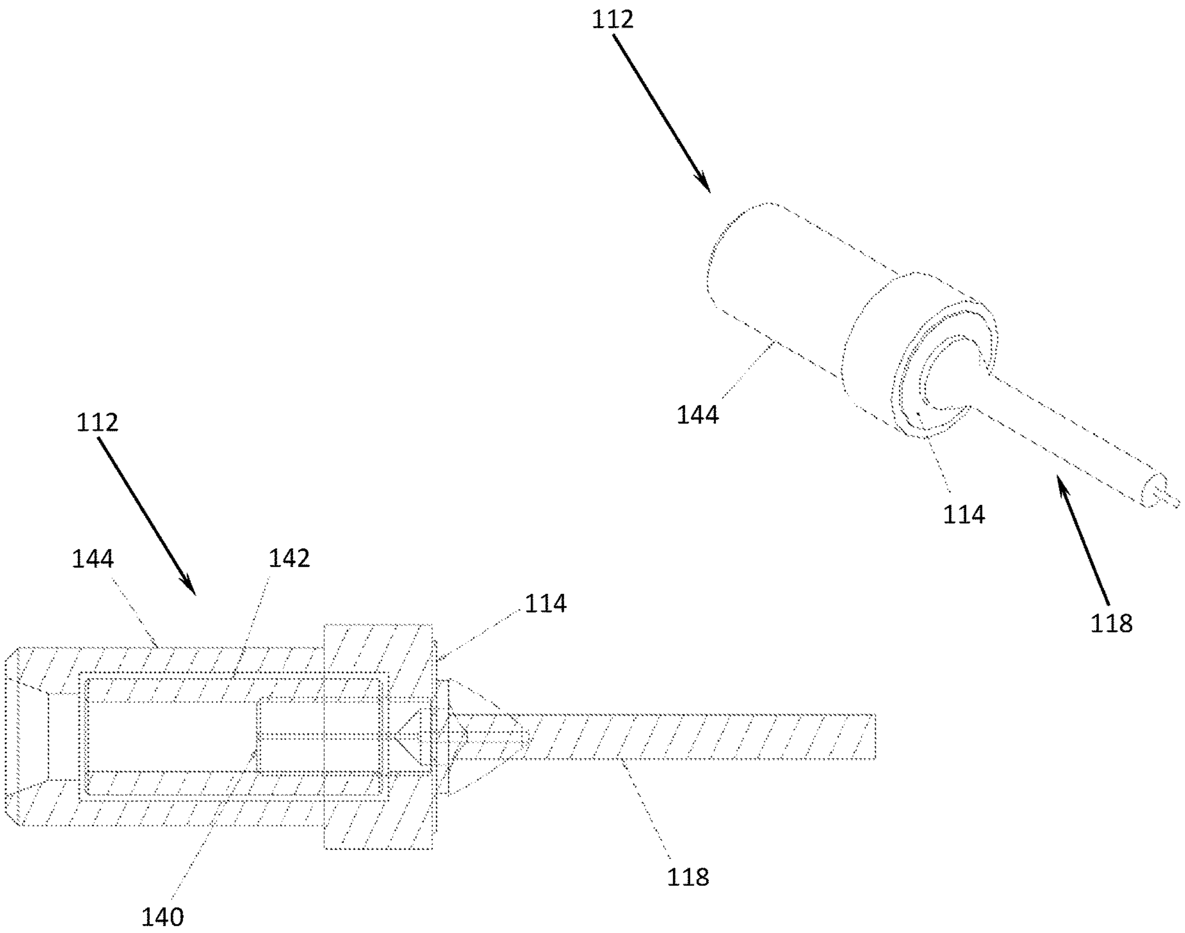
FIG. 8 illustrates cross-sectional and rear perspective views of one embodiment of the optical fiber ferrule assembly of the optical fiber adaptor assembly of the present disclosure.

FIG. 8 shows cross-sectional and rear perspective views of the ferrule assembly 112 of the adaptor assembly 100. The ferrule assembly 112 receives the optical fiber 118 at the ferrule shoulder 114 and includes a glass ferrule 140, a zirconia split sleeve 142 to align the ferrule 140, and a housing 144 to contain the ferrule 140 and split sleeve 142 and provide features to contain the housing 144 within the adaptor body 102.

Figure 9:
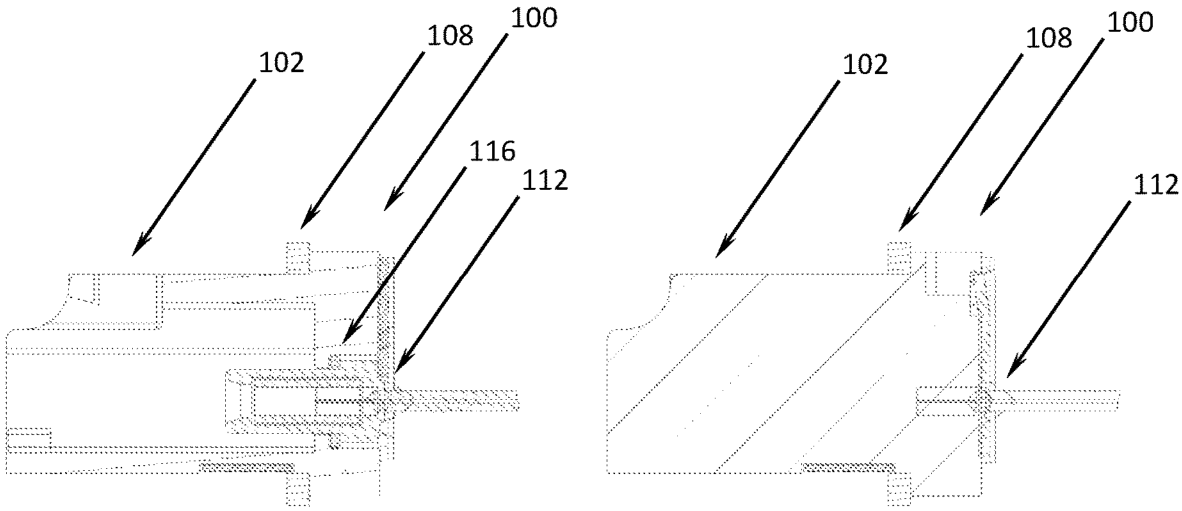
FIG. 9 illustrates cross-sectional views of one embodiment of the optical fiber adaptor assembly of the present disclosure, with the installed optical fiber ferrule assemblies.

FIG. 9 shows cross-sectional views of the adaptor assembly 100 with the ferrule assemblies 112 installed in the adaptor body 102. The panel gasket 108 and ferrule assembly gasket 116 consist of a metal fiber filled closed cell foam or the like to provide EMI shielding and are compressible to provide spring force.

Figure 10:
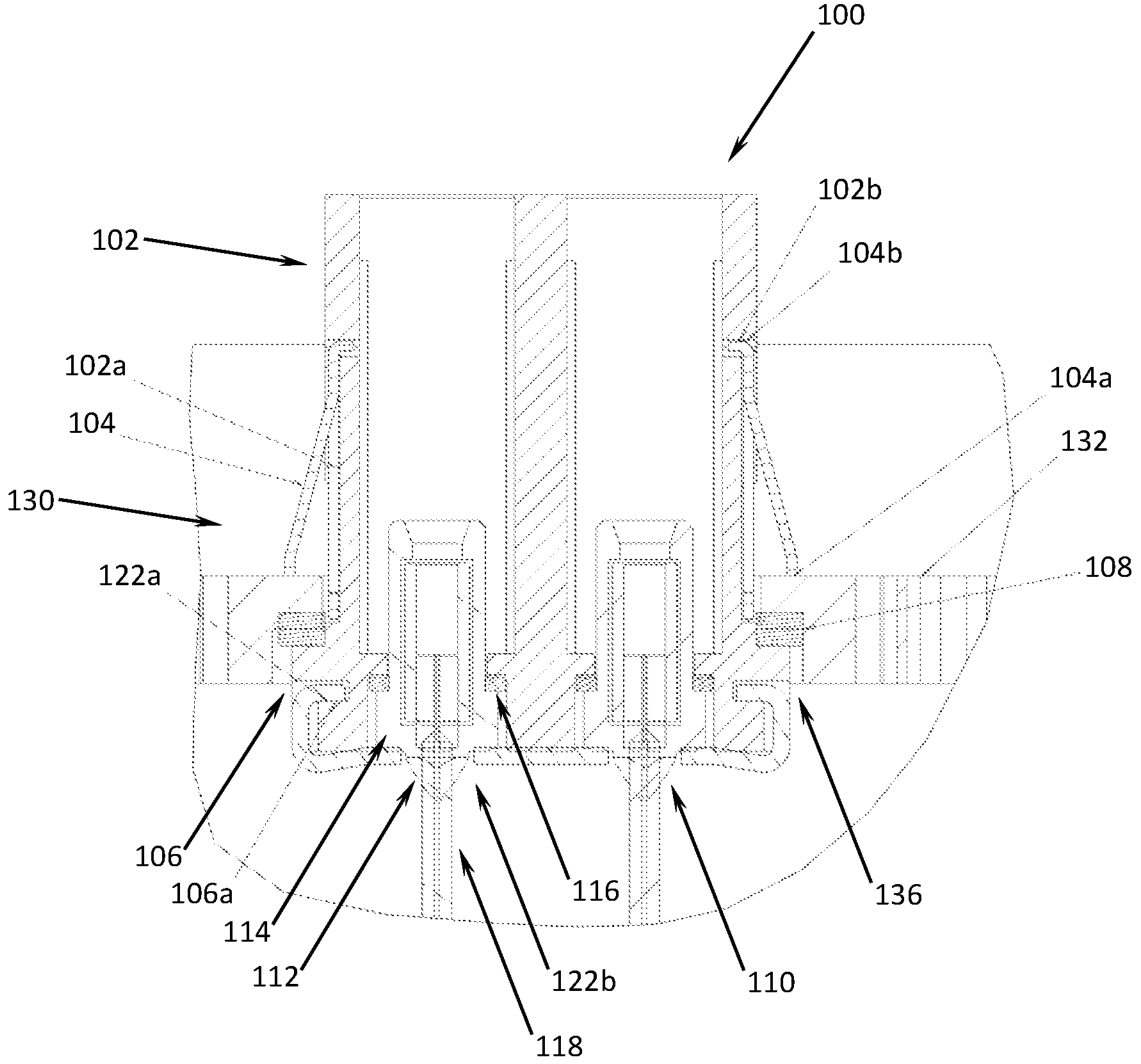
FIG. 10 illustrates a cross-sectional view of one embodiment of the optical fiber adaptor assembly of the present disclosure, with the installed optical fiber ferrule assemblies.

FIG. 10 shows a cross-sectional view of the adaptor assembly 100 with the installed ferrule assemblies 112. The adaptor body 102 is secured to the panel 132 via the panel retention clip 104 disposed around and/or coupled to the adaptor body 102. The adaptor body 102 is disposed through the cut-out 136 in an internal-to-external direction and the adaptor shoulder 106 of the adaptor body 102 is adapted to compress the panel gasket 108 that is disposed about the adaptor body 102 against the internal side of the panel 132, thereby providing sealing engagement of the adaptor body 102 to the panel 132 via the panel retention clip 104.

The internal side of the adaptor body 102 includes the ferrule ports 110 for receiving the corresponding ferrule assemblies 112 within the module or circuit pack 130. Each of the ferrule assemblies 112 include the ferrule shoulder 114 that limits penetration of the ferrule assembly 112 into the adaptor body 102 and compresses the corresponding ferrule gasket 116 against the adaptor body 102, again providing the degree of sealing engagement. As illustrated for this duplex adaptor 100, internal transmit and receive ferrule ports 110 are provided to receive transmit and receive ferrule assemblies 112 and the corresponding optical fibers 118.

The external side of the adaptor body 102 includes the connector ports 120 for receiving the corresponding connectors 134 within the module or circuit pack 130 in the conventional manner. As illustrated for this duplex adaptor 100, external transmit and receive connector ports 120 are provided to receive transmit and receive connectors 134 and the corresponding optical fibers. The connector ports 120 may be, for example, TIA-FOCIS-10B-compliant duplex LC receptacle ports or the like that are accessible from the external side of the panel due to the protrusion of the adaptor body 102 through and from the external side of the panel 132.

The ferrule assemblies 112 disposed in and aligned by the ferrule ports 110 on the internal side of the adaptor body 102 are secured to the adaptor body 102 using the ferrule retention clip 122 that includes the arm structures 122*a* that are configured to be slid vertically downwards in the slot structures 106*a* of the adaptor shoulder 106 of the adaptor body 102. The ferrule retention clip 122 contacts the ferrule shoulders 114 of the ferrule assemblies 112 at the internal-side end of the adaptor body 102 and prevents the ferrule assemblies 112 from backing out of the adaptor body 102. The ferrule retention clip 122 includes the vertical slots 122*b* corresponding to the ferrule assemblies 112 that allow the ferrule assemblies 112 to pass through the ferrule retention clip 122. The ferrule retention clip 122 includes the clip arm 122*c* that is adapted to engage the corresponding clip recess 106*b* of the adaptor shoulder 106 when the ferrule retention clip 122 is in place, thereby securing the ferrule retention clip 122 to the adaptor body 102 and locking the ferrule assemblies 112 in place.

The panel retention clip 104 is adapted to nest within the clip recess 102*a* formed around some or all sides of the adaptor body 102, thereby allowing the panel retention clip 104 to sit flush with the surface(s) of the adaptor body 102. The pair of opposed spring arms, tabs, or the like 104*a* are provided on the panel retention clip 104 and designed to deflect as the adaptor body 102 is inserted through the panel and expand when the adaptor shoulder 106 of the adaptor body 102 is seated against the panel gasket 108 and the internal side of the panel, thereby securing the adaptor body 102 to the panel. Inwards squeezing of the opposed spring arms, tabs, or the like 104*a* serves to release the adaptor body 102 for removal from the panel.

An illustrative installation procedure for the adaptor assembly 100 is as follows:

1. The panel retention clip 104 followed by the panel gasket 108 are installed onto the adaptor body 102.
   a. The panel retention clip 104 sits in the cavity 102*a* of the adaptor body 102, and the internally bent tabs 104*b* mate with the cut-outs 102*b* in the adaptor body 102 to further secure the clip 104.
2. The ferrule assembly gaskets 116 are installed onto the ferrule housings 144 of the optical fibers 118 with the ferrule assemblies 112.
3. The optical fibers 118 are inserted into the adaptor body 102 and secured in place by sliding the ferrule retention clip 122 onto the adaptor body 102 until it is fully seated and the locking tab 122*c* is engaged with the locking feature 106*b*.
   a. The ferrule retention clip 122 has an intentional interference with the adaptor body 122. The clip 122 is deformed slightly, and the rebounding force causes the inner surface of the ferrule retention clip 122 to stay in contact with the internal surface of the adaptor body 102.
   b. The ferrule assembly gaskets 116 are under compression once the optical fibers 118 are installed. This compression forces the back surface of the ferrule housing 114 into the inner surface of the ferrule retention clip 122 to maintain the face of the ferrule 112 at the optical reference plane defined by TIA-FOCIS-10B.
4. The adaptor assembly 100 is inserted into the faceplate panel 132 until the flexible tabs 104 on the panel retention clip 104 engage with the external surface of the faceplate panel 132.
   a. The panel gasket 108 is under compression once the adaptor assembly 100 is installed, forcing the tabs 104*a* into the external surface of the faceplate panel 132 to maintain contact and prevent motion of the adaptor assembly 100 during the insertion and extraction of the connectors 134.

There is a significant increase in available space behind the faceplate panel 132 when using the adaptor assembly 100 of the present disclosure, as compared with a typical LC adaptor assembly 150. The available space previously used for optical connection can thus be used for other mechanical or optical components. Tool-less assembly of the optical fiber 118 with ferrule assembly 112 into the adaptor body 102 is provided using the ferrule retention clip 122. The ferrule retention clip 122 acts as a spring to maintain the inner surface of the ferrule retention clip 122 to stay in contact with the internal surface of the adaptor body 102, which in combination with the ferrule assembly gaskets 116 aligns the back surface of the ferrule housing 144 with the internal surface of the adaptor body 102. This reduces the tolerances and more accurately maintains the specified distances between the mechanical reference plane and the optical reference plane, as defined by TIA-FOCUS-10B, as only the tolerances of the adaptor body 102 and optical fiber 118 with ferrule assembly 112 impact the variability. The internally bent tabs 104*b* on the panel retention clip 104 improve the mating with the adaptor body 102 during connector 134 insertion. High forces during connector 134 insertion can cause the flexible tabs 104*a* of the panel retention clip 104 to deform and splay outwards, and in some cases result in the clip 104 de-mating from the adaptor body 102. The internally bent tabs 104*b* prevent the panel retention clip 104 from de-mating from the adaptor body 102 if the panel retention clip 104 starts to deform and splay outwards. Finally, the adaptor assembly of the present disclosure provides an improved ability to rework or replace the optical fibers 118 and/or the module or circuit pack 130 as such replacement only requires compressing the flexible tabs 104*a* on the panel retention clip 104 to remove the adaptor assembly 100 from the faceplate panel 132, and lifting the locking tab 122*c* on the ferrule retention clip 122 to slide it off of the adaptor body 102, thereby freeing the optical fibers 118.

Although the present disclosure is illustrated and described with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. An optical fiber adaptor assembly comprising:

an adaptor body having an internal side and an external side, wherein the internal side is adapted to receive and retain an optical fiber ferrule assembly and the external side is adapted to receive and retain an optical fiber connector assembly, wherein the internal side defines a ferrule port adapted to receive the optical fiber ferrule assembly wherein the adaptor body is adapted to be disposed through and retained in a cut-out defined by a panel of a module or circuit pack, wherein the internal side comprises an adaptor shoulder that is adapted to be disposed adjacent to an internal side of the panel when the adaptor body is disposed through and retained in the cut-out defined by the panel, and wherein the internal side further comprises a ferrule retention clip that is adapted to be coupled to the adaptor shoulder and prevent the optical fiber ferrule assembly from backing out of the ferrule port.

2. The optical fiber adaptor assembly of claim 1, wherein the internal side of the adaptor body further comprises a ferrule gasket adapted to be disposed between a ferrule shoulder of the optical fiber ferrule assembly and the internal side of the adaptor body when the optical fiber ferrule assembly is received within the ferrule port defined by the internal side of the adaptor body.

3. The optical fiber adaptor assembly of claim 1, wherein the ferrule retention clip comprises arm structures that are adapted to be disposed within slot structures of the adaptor shoulder.

4. The optical fiber adaptor assembly of claim 1, wherein the internal side of the adaptor body further comprises a panel gasket disposed between the adaptor shoulder and the internal side of the panel when the adaptor shoulder is disposed adjacent to the internal side of the panel when the adaptor body is disposed through and retained in the cut-out defined by the panel.

5. The optical fiber adaptor assembly of claim 1, wherein the external side of the adaptor body defines a connector port adapted to receive the optical fiber connector assembly.

6. The optical fiber adaptor assembly of claim 1, further comprising a panel retention clip coupled to the adaptor by and adapted to secure the adaptor body to the panel when the adaptor body is disposed through and retained in the cut-out defined by the panel.

7. The optical fiber adaptor assembly of claim 1, wherein the optical fiber adaptor assembly is a duplex optical fiber adaptor assembly, the internal side is adapted to receive and retain a pair of optical fiber ferrule assemblies, and the external side is adapted to receive and retain a pair of optical fiber connector assemblies.

8. A module or circuit pack comprising:

a panel having an internal side and an external side and defining a cut-out; and an optical fiber adaptor assembly comprising an adaptor body having an internal side and an external side, wherein the internal side receives and retains an optical fiber ferrule assembly and the external side is adapted to receive and retain an optical fiber connector assembly, wherein the internal side defines a ferrule port adapted to receive the optical fiber ferrule assembly, wherein the adaptor body is adapted to be disposed through and retained in the cut-out defined by the panel, wherein the internal side comprises an adaptor shoulder that is adapted to be disposed adjacent to an internal side of the panel when the adaptor body is disposed through and retained in the cut-out, and wherein the internal side further comprises a ferrule retention clip that is adapted to be coupled to the adaptor shoulder and prevent the optical fiber ferrule assembly from backing out of the ferrule port.

9. The module or circuit pack of claim 8, wherein the optical fiber adaptor assembly is a duplex optical fiber adaptor assembly, the internal side receives and retains a pair of optical fiber ferrule assemblies, and the external side is adapted to receive and retain a pair of optical fiber connector assemblies.

10. An optical fiber adaptor assembly comprising:

an adaptor body having an internal side and an external side, wherein the internal side is adapted to receive and retain an optical fiber ferrule assembly and the external side is adapted to receive and retain an optical fiber connector assembly, wherein the internal side defines a ferrule port adapted to receive the optical fiber ferrule assembly, wherein the internal side comprises a ferrule gasket adapted to be disposed between a ferrule shoulder of the optical fiber ferrule assembly and the internal side when the optical fiber ferrule assembly is received within the ferrule port, and wherein the adaptor body is adapted to be disposed through and retained in a cut-out defined by a panel of a module or circuit pack.

11. The optical fiber adaptor assembly of claim 10, wherein the internal side of the adaptor body comprises an adaptor shoulder that is adapted to be disposed adjacent to an internal side of the panel when the adaptor body is disposed through and retained in the cut-out defined by the panel.

12. The optical fiber adaptor assembly of claim 11, wherein the internal side of the adaptor body further comprises a ferrule retention clip that is adapted to be coupled to the adaptor shoulder and prevent the optical fiber ferrule assembly from backing out of the ferrule port defined by the internal side of the adaptor body.

13. The optical fiber adaptor assembly of claim 12, wherein the ferrule retention clip comprises arm structures that are adapted to be disposed within slot structures of the adaptor shoulder.

14. The optical fiber adaptor assembly of claim 11, wherein the internal side of the adaptor body further comprises a panel gasket disposed between the adaptor shoulder and the internal side of the panel when the adaptor shoulder is disposed adjacent to the internal side of the panel when the adaptor body is disposed through and retained in the cut-out defined by the panel.

15. The optical fiber adaptor assembly of claim 10, wherein the external side of the adaptor body defines a connector port adapted to receive the optical fiber connector assembly.

16. The optical fiber adaptor assembly of claim 10, further comprising a panel retention clip coupled to the adaptor by and adapted to secure the adaptor body to the panel when the adaptor body is disposed through and retained in the cut-out defined by the panel.

17. The optical fiber adaptor assembly of claim 10, wherein the optical fiber adaptor assembly is a duplex optical fiber adaptor assembly, the internal side is adapted to receive and retain a pair of optical fiber ferrule assemblies, and the external side is adapted to receive and retain a pair of optical fiber connector assemblies.

* * * * *